United States Patent [19]

Voorhies

[11] 4,082,652

[45] Apr. 4, 1978

[54] PROCESS FOR IMPROVED CARBON-SUPPORTED HYDRODESULFURIZATION CATALYSTS

[75] Inventor: John Davidson Voorhies, New Canaan, Conn.

[73] Assignee: American Cyanamid Company, Stamford, Conn.

[21] Appl. No.: 649,374

[22] Filed: Jan. 15, 1976

Related U.S. Application Data

[63] Continuation-in-part of Ser. No. 562,524, Mar. 27, 1975, abandoned.

[51] Int. Cl.$^2$ .................... C10G 23/02; B01J 27/02
[52] U.S. Cl. .................................... 208/216; 252/439
[58] Field of Search ................ 252/439, 444, 447; 208/216

[56] References Cited

U.S. PATENT DOCUMENTS

| | | | |
|---|---|---|---|
| 2,309,718 | 2/1943 | Thacker | 252/439 X |
| 2,687,381 | 8/1954 | Hendricks | 252/465 X |
| 2,713,073 | 7/1955 | Smith | 252/439 X |
| 2,813,911 | 11/1957 | Mason et al. | 252/439 X |
| 3,416,893 | 12/1968 | Parish et al. | 252/439 X |
| 3,725,303 | 4/1973 | Urban et al. | 252/439 |
| 3,803,054 | 4/1974 | Habig et al. | 252/439 |
| 3,997,473 | 12/1976 | Schmitt, Jr. et al. | 252/439 |

*Primary Examiner*—Patrick P. Garvin
*Assistant Examiner*—William G. Wright
*Attorney, Agent, or Firm*—William J. van Loo

[57] ABSTRACT

An improved carbon-supported hydrodesulfurization catalyst is obtained when the support first has deposited thereon a molybdenum compound convertible to $MoS_2$, said molybdenum compound is converted to $MoS_2$, and subsequently additional molybdenum compound, if necessary, and a metal compound selected from nickel and cobalt compounds are deposited thereon.

10 Claims, No Drawings

PROCESS FOR IMPROVED CARBON-SUPPORTED HYDRODESULFURIZATION CATALYSTS

CROSS-REFERENCES TO RELATED APPLICATIONS

This application is a continuation-in-part of application Ser. No. 562,524, now abandoned filed Mar. 27, 1975.

This invention relates to a process for preparing a carbon-supported hydrodesulfurization catalyst. More particularly, this invention relates to such a process wherein at least part of the molybdenum content of the catalyst is first deposited upon the carbon support and sulfided followed by, in at least one step, subsequent deposition of additional metal compounds that are capable of being converted to the corresponding sulfides.

Hydrodesulfurization has long been recognized as a means for removing sulfur from various petroleum fractions. Catalysts based on inorganic oxide gels, such as alumina, activated with molybdenum and cobalt or nickel compounds have been used in such reactions. In many reactions, such as those involving petroleum distillates, these alumina based catalysts can be effectively regenerated to extend their active service life. However, petroleum residue, which are currently considered for hydrotreating for additional petroleum values, contain metal contaminants such as vanadium and, quite often, asphaltenes, both of which contaminants complicate processing for hydrodesulfurization As a result, alumina-based hydrodesulfurization catalysts have a short active life due to poisoning by the contaminants. Attempts to regenerate the alumina-based catalysts have not met with success with the result that the spent catalysts are discarded. In addition, attempts to recover metal values from the spent catalysts are complicated by the nature and properties of the alumina supports. Thus, processes for the hydrodesulfurization of petroleum residua employing alumina-based catalysts are unattractive because of the short active life of the catalyst, the inability to regenerate the catalyst effectively, and the difficulties involved in attempting to recover metal values.

It has been proposed to employ carbon-supported catalysts for use in hydrodesulfurization of petroluem fractions because of their low initial cost, high intrinsic activity, and the ready recovery of metal values by burning off the carbon of spent catalysts. However, the activity values actually provided by the carbon-supported catalysts have left much to be desired and carbon-supported catalysts of improved activity in hydrodesulfurization reactions are desired. Such a provision would provide a notable advance in the art and fulfill a long-felt need.

Accordingly, it is a primary object of the present invention to provide a carbon-supported hydrodesulfurization catalyst of improved activity. It is also an object of the present invention to provide a process for the preparation of an improved hydrodesulfurization catalyst based on a carbon support. Additional objects of the present invention will become apparent from the detailed discussion thereof which follows.

In accordance with the present invention, there is provided a process for preparing an improved hydrodesulfurization catalyst which comprises:

(1) depositing upon a carbon support sufficient of a molybdenum compound capable of being converted to $MoS_2$ to provide a support after said conversion containing from about 5 to about 25 weight percent $MoS_2$, based on the weight of said support;

(2) treating the support obtained from step (1) to convert said molybdenum compound to $MoS_2$;

(3) depositing upon the support obtained from step (2) in at least one step sufficient of a molybdenum compound capable of being converted to $MoS_2$ to increase the content of $MoS_2$ on said support after said conversion to about 10 to about 25 weight percent $MoS_2$, based on the weight of said support, and sufficient of a metal compound selected from the group consisting of nickel and cobalt compounds capable of being converted to the corresponding metal sulfide to provide from about 0.4 to 6.0 weight percent of said metal compound, based on the weight of said support.

The process of the present invention provides an effective carbon-supported hydrodesulfurization catalyst for hydrogenative removal of sulfur from petroleum fractions or heavy oils having a service life of at least six months and providing the following unexpected advantages:

(1) specificity for sulfur removal over nitrogen removal and hydrogenation of other compounds;

(2) improved activity over prior art carbon-supported hydrodesulfurization catalysts; and (3) economical operation. The present invention provides an improved carbon-supported catalyst for specialized sulfur removal operations where sulfur specificity is required. Further, the present invention provides a carbon-supported catalyst for conversion of trace amounts of organic sulfur to $H_2S$ with simultaneous adsorption of the $H_2S$, such as in the purification of tail gas.

As carbon supports useful in carrying out the process of the present invention are those that are known and used for such purpose. A variety are readily available commercially under numerous tradenames. Such carbons are supplied in various mesh sizes as particulates having a range of physical properties. Typically, these carbon particulates have properties in the ranges given in Table I below.

TABLE I

| | | |
|---|---|---|
| ($SA_{BET}$) | Surface Area, square meters per gram (determined by the method of Brunauer, Emmett, and Teller: J. Am. Chem. Soc. 60, 309 (1938)) | 380–1235 |
| (PV) | Pore Volume, cubic centimeters per gram (determined by water adsorption at room temperature) | 0.8–1.2 |
| (CBD) | Compacted Bulk Density, grams per cubic centimeter (determined by weighing a specified volume of vibrated particles) | 0.42–0.59 |
| ($\bar{r}$) | Average Pore Radius, Angstrom units (calculated from the equation $$\bar{r} = \frac{2PV}{SA_{BET}} \times 10^4$$ | 15–47 |

A preferred carbon support is one having a particle size in the range of about 12–16 mesh, a pore volume of about 0.8–1.0 cc/gm., a BET surface area of about 1000–1200 m²/g., a CBD of about 0.45–0.55 gm./cc., and an average pore radius of about 15–55 Angstrom units. The support may be pulverized and/or screened to provide the desired particle size range.

Although commercially available carbons of the physical properties described above are conveniently employed in carrying out the process of the present invention, it is to be understood that other carbon supports may also be employed. Thus, it is known that the pore sizes of various commercial carbons can be enlarged by oxidation treatments which lead to so-called "wide-pore" carbons. Other carbons of larger pore sizes are obtainable by suitable structuring of carbonaceous materials. Such additional carbon supports are useful for preparing carbon supported catalysts in accordance with the present invention and may be preferred for certain hydrodesulfurization reactions wherein large reactant molecules present diffusion problems with respect to the commercially available carbons described. Thus, the present invention is not limited to any specific carbon support but may be advantageously applied to any carbon suitable for use as a catalyst support.

After a carbon support has been suitably selected as described above, it is subjected to deposition of a suitable molybdenum compound thereon. A suitable molybdenum compound is one which is capable of being converted to $MoS_2$. Suitable compounds include $MoO_3$, ammonium molybdates, ammonium thiomolybdate, and the like. The molybdenum compound may be deposited upon the carbon support in any convenient manner. A preferred manner is to pore saturate the carbon support with a solution of the molybdenum compound. Alternatively, the molybdenum compound may be deposited by spraying a dispersion or solution of the carbon support, by dipping the carbon support into a suitable dispersion or solution of the molybdenum compound, by selective adsorption from a suitable dispersion or solution of the molybdenum compound, or by such other techniques as will provide the content of molybdenum compound. The amount of such molybdenum compound to be deposited on the carbon support is that amount which will supply about 5 to about 25 weight percent of $MoS_2$, based on the weight of said support.

It is to be noted that the carbon-supported catalyst to be provided by the process of the present invention is to contain from about 10 to about 25 weight percent of $MoS_2$, based on the weight of the support. Accordingly, the amount of molybdenum compound to be initially deposited upon the carbon support may constitute the total amount contemplated or only a portion thereof.

After the molybdenum compound has been deposited upon the carbon support as indicated, the support is next treated to convert the molybdenum compound deposited thereon to $MoS_2$. The treatment may vary depending upon the nature of the molybdenum compound deposited. For example, when the molybdenum compound deposited on the carbon support is in the form of $MoO_3$ dissolved in aqueous $(NH_4)_2S$, the resulting carbon support may be heat treated in an inert medium at 300°–450° C., preferably 400°–450° C., to provide the $MoS_2$ content. In such instance, it is generally preferable to remove the water arising from the aqueous deposition solution by drying in air at about 50°–90° C. for about 30–90 minutes, followed by vacuum drying at about 120°–150° C. under about 1–10 mm. Hg. absolute pressure for about 30–90 minutes prior to heat treatment to provide the $MoS_2$. Inert atmospheres include nitrogen, argon, helium, and the like.

Alternatively, when the molybdenum compound deposited upon the carbon support is in the form of an aqueous solution of an ammonium molybdate, the resulting support may be sulfided with $H_2S$ to provide the $MoS_2$. Drying to remove aqueous deposition medium may be as previously indicated prior to sulfiding. Still other conventional methods of providing the $MoS_2$ content on the carbon support may be employed as are consistent with the materials involved.

After the treatment to convert the molybdenum compound to $MoS_2$ has been effected as indicated, the thus-treated support is next subjected in at least one step to deposition of additional materials thereon. This subsequent deposition involves a metal compound selected from the group consisting of nickel and cobalt compounds capable of being converted to the corresponding metal sulfide and as much more, if any, of a molybdenum compound capable of being converted to $MoS_2$ as is necessary to provide a total content of $MoS_2$, based on the weight of said support, of about 10 to about 25 weight percent. The compound of the nickel or cobalt compond deposited should be such as to provide from about 0.4 to 6.0 weight percent thereof, based on the weight of the carbon support.

By the expression "in at least one step", as that expression is employed herein, is meant that the subsequent deposition of metal compound or compounds may consist of one step or more than one step. For example, if all of the molybdenum compound is employed in the first deposition step, then a metal compound selected from the group consisting of nickel and cobalt compounds capable of conversion to the corresponding metal sulfide may be deposited on the support in one or more deposition steps. Alternatively, if only part of the molybdenum compound has been deposited on the support in the first deposition step, the remainder of the molybdenum compound may be admixed with the nickel or cobalt compound and deposited on the carbon support in a second deposition step. Still further, if only part of the molybdenum compound is deposited in the first deposition step, the nickel or cobalt compound may be deposited on the support in a second deposition step and, subsequently, the remainder of the molybdenum compound may be deposited on the support in a third deposition step. Any other sequence or combination may be employed in depositing the necessary metal compounds on the carbon support, the only essential requirement being that a first deposition of molybdenum compound and conversion thereof to $MoS_2$ be carried out prior to complete deposition of the metal compounds, as indicated.

The total amount of molybdenum compound to be applied to the carbon support is to be sufficient to provide about 10 to about 25 weight percent $MoS_2$, preferably about 12–16 weight percent, based on the weight of the carbon support. Since the minimum amount of molybdenum compound that can be deposited on the support in the first deposition step will provide only about 5 weight percent of $MoS_2$, it is clear that in various instances, therefore, it will be necessary to increase the molybdenum content in a subsequent deposition step to obtain the required or desired amount of molybdenum as the sulfide. It is generally preferred, however, to apply all of the molybdenum compound in the first deposition step. In applying the molybdenum compound in more than one deposition step, however, it is not necessary to use the same molybdenum compound in each deposition step, it is only necessary that the molybdenum compound be capable of being converted to $MoS_2$.

In providing the content of a metal compound selected from the group consisting of nickel and cobalt compounds capable of being converted to the corresponding metal sulfide, the procedures of deposition indicated above in conjunction with the molybdenum compound may be employed. Preferred compounds include nickelous formate, nickelous acetate, and cobaltous acetate. As indicated, the amount of nickel or cobalt compound deposited should be such as to provide from about 0.4 to 6.0 weight percent thereof, based on the weight of the support, preferably about 0.9 to 5.0 weight percent, same basis. The total content of nickel or cobalt compound may be provided in one or more deposition steps, as indicated, with or without any content of additional molybdenum content as may be required.

After a second deposition of metal compounds on the support has been effected so as to provide all of the metal content contemplated, no additional processing is necessary. Drying to remove water that may have been used in conjunction with deposition may be carried out by as described above with respect to drying after the initial deposition step. The same procedure may be used if alternative solvents were employed. However, drying may occur at ambient conditions without any specific step being associated therewith.

When more than one subsequent deposition step is contemplated, it is generally preferred to carry out drying between steps in the manner described above with respect to the initial deposition step. However, the drying may occur at ambient conditions without any specific step being associated therewith.

Although the present process does not require additional treatments to convert the various metal compounds to the corresponding sulfides except after the first deposition of molybdenum compound, it is, nevertheless, possible to employ such treatments, if desired. Thus, treatment may be effected after any or all of the subsequent deposition steps contemplated to convert metal compounds to the corresponding metal sulfide, if desired, without departing from the intended scope of the present invention. When such subsequent sulfidizing treatment is contemplated, it may be carried out as previously described.

The catalyst material provided by the process of the present process, as is indicated, is intended for use in a hydrodesulfurization process. In conjunction with such process, the catalyst is placed in a suitable reactor and brought to reaction conditions. The catalyst sulfided while in the reactor and, consequently, provision for treatment to convert metal compounds to the corresponding sulfides prior to actual use, except for the molybdenum compound resulting from the first deposition step, is unnecessary.

Furthermore, it is not precisely known, nor readily determined, what form the nickel or cobalt compound is in during the hydrodesulfurization reaction or after preliminary sulfiding in the reactor. It may exist as the free element or as the sulfide or both. However, if the nickel or cobalt compound is deposited on the carbon support as a compound convertible to the corresponding sulfide, the improved catalyst of the present invention is obtained.

The catalyst resulting from the process of the present invention is ready for use in a hydrodesulfurization unit and preliminary sulfiding of the catalyst may be carried out according to standard procedures. The catalyst composition prepared in accordance with the process of the present invention exhibits hydrodesulfurization activity which is at least 300% better than the activity obtained with a prior art carbon-supported catalyst obtained by the conventional preparative method. The carbon catalyst of the present invention also exhibits greatly improved intrinsic activity over conventional alumina-supported hydrodesulfurization catalysts in treatment of thiophene.

The invention is more fully illustrated in the examples which follow wherein all parts and percentages are by weight unless otherwise specified. In carrying out evaluation of the catalysts in hydrodesulfurization, two procedures are involved and these procedures are next described.

EVALUATION FOR THIOPHENE ACTIVITY

In carrying out the test, a mixture of hydrogen and thiophene is passed through a fixed catalyst bed held at various temperatures within a furnace. The product gas is analyzed for thiophene and compared to the feed composition. A first order rate constant is then calculated, knowing the catalyst weight and feed rate of gas to bed, and this rate constant is divided by that of a standard catalyst and the result multiplied by 100 to obtain relative activity numbers. In practice, values are obtained at three or four temperatures and these are averaged to obtain the final value reported.

In carrying out the test, all catalysts were subjected to a standard pre-sulfiding in a mixture of $H_2$—$H_2S$ before activity values were determined. In instances where the activator metal components of the catalyst composition are already in sulfide form, the subsequent sulfiding will not affect this sulfide content. After the pre-sulfiding, all activator metal components are substantially in the form of the sulfides. Thiophene, liquid at room temperature, was entrained in the hydrogen flow by means of a saturator held at 0° C. to provide about 3% thiophene in the reactant stream.

The testing apparatus held four catalyst tubes within the same furnace and connected to the same feed line. In every run, one of the tubes contained the standard catalyst so that comparisons between different runs could be made.

In carrying out the tests, the following procedure was followed.

1. The catalysts were purged with 10% $H_2S$ and 90% $H_2$ mixture and then heated to 400° C.
2. The system was held at 400° C. for 1 hour with the $H_2S$—$H_2$ mixture flowing and then allowed to cool.
3. When the temperature dropped to 250° C. the $H_2S$—$H_2$ flow was stopped and the thiophene-$H_2$ flow was begun.
4. The temperature was allowed to stabilize at about 180° C. After about 30 minutes, samples of the products and reactant gases were taken and flow rates through the tubes measured.
5. The temperature was increased to 200° C. and step 4 was repeated. The temperature was then increased to 215° C. and step 4 was again repeated. Finally, the temperature was increased to 230° C. and step 4 was again repeated.

EVALUATION FOR GAS OIL ACTIVITY

The catalysts were evaluated for their activity in removing sulfur from a gas oil petroleum fraction in a fixed bed reactor in accordance with conventional procedures. The catalysts were presulfided in the reactor by standard procedures using 10% $H_2S$—90% $H_2$ at 700° F. and atmospheric pressure for 2 hours. Gas oil and hydrogen were passed through the test beds and, after several hours to attain steady state equilibrium, a liquid product sample was taken for analysis. The test conditions were as follows:

| GAS OIL TEST CONDITIONS | |
|---|---|
| Pressure | 750 psig |
| Temperature | 650 and 725° F. |
| Liquid Hour Space Velocity | 2 |
| Liquid Feed | 100 cc./hr. |
| $H_2$ Feed | 3.7 SCF/hr. |
| Catalyst Volume | 50 cc. |

The gas oil feedstock had the following properties:

| GAS OIL PROPERTIES | |
|---|---|
| A.P.I. Gravity | 23.3 |
| Boiling Range | 490–725° F. |
| Sulfur | 1.0% |
| Basic N | 515 ppm. |

Separate runs were made with each catalyst at the two operating temperatures. Second order rate constants were calculated from the sulfur removal data and relative activities were derived in accordance with the procedure described above with respect to thiophene activity.

EXAMPLE 1

A. Impregnation to Provide $MoS_2$ Content

In this example, the carbon support employed had the following properties:

| SABET, $m^2$/gm. | 1100 |
|---|---|
| PV cc/gm. | .92 |
| CBD g/cc. | .44 |
| F A | 17 |
| Particle Size | 12 × 40 mesh |

The carbon particulates were sieved so as to provide 200 cubic centimeters of 12–16 mesh size, which was dried at 140° C. for one hour. An ammonium thiomolybdate solution was prepared by dissolving 15.0 grams of $MoO_3$ in 100 cubic centimeters of 23.9% aqueous $(NH_4)_2S$. Then, 118 grams of the dried carbon were impregnated with 96.5 cubic centimeters of the ammonium thiomolybdate solution. The impregnated carbon was then dried at 60°–80° C. for 40 minutes and vacuum dried at 132° C. for 1 hour at about 1 millimeter of Hg., absolute pressure. The dried impregnated support was then heated under helium at 400°–450° C. for 1 hours.

B. Impregnation to Provide Nickelous Acetate Content

A solution of nickelous acetate was prepared in which 16.37 grams of $Ni(C_2H_3O_2)_2.4H_2O$ were present per 100 cc. of aqueous solution. Then 50 grams of the impregnated carbon of part A above were impregnated with 40 cc. of the nickelous acetate solution. The thus-impregnated carbon was then dried at 60°–80° C. for 1 hour. The thus-dried carbon was then dried at 134° C. for 2 hours at 1 mm. of Hg. absolute pressure. The catalyst obtained was a carbon support carrying 3% Ni, as the acetate, and 13% $MoS_2$.

EXAMPLE 2

A. Impregnation to Provide $MoS_2$ Content

The procedure of Example 1A was followed in every detail.

B. Impregnation to Provide Cobaltous Acetate Content

A solution of cobaltous acetate was prepared in which 16.37 grams of $Co(C_2H_3O_2)_2.4H_2O$ were present per 100 cc. of aqueous solution. Then 60 grams of the impregnated support of part A above was impregnated with 48 cc. of the cobaltous acetate solution. The thus-impregnated carbon was dried at 60°–80° C. for ½ hour and then dried at 140° C. for 2 hours at 1 mm. Hg. absolute pressure.

COMPARATIVE EXAMPLE A

The carbon support was as in Example 1. An aqueous phosphoric acid solution of $MoO_3$ and cobaltous acetate was prepared by diluting 0.63 grams of 85% $H_3PO_4$ to 9.0 cc. with water. Then 1.83 grams $(NH_4)_6Mo_7O_{24}.4H_2O$ and 1.16 grams $Co(NO_3)_2.6H_2O$ were dissolved in the acid solution. The resulting solution was then used to impregnate 8.2 grams of the carbon support. The carbon catalyst was dried at 110° C. for 2 hours and then at 250° C. for 1 hours.

EXAMPLE 3

Catalyst Evaluation-Thiophene Test

The catalysts of Examples 1 and 2 and Comparative Example A were evaluated in hydrodesulfurization employing the thiophene test described above. The catalyst of Comparative Example A was arbitrarily assigned a standard activity value of 100 both on a weight basis and on a volume basis and the catalysts prepared by the process of the invention were rated relative to the standard values. The results are given in Table II below wherein RWSA indicates relative hydrodesulfurization activity on a weight basis and RVSA indicates relative hydrodesulfurization activity on a volume basis for each of the catalysts.

TABLE II

| | Thiophene Activity | | | | |
|---|---|---|---|---|---|
| | Activator Content (%) | | | | |
| Catalyst of Example | $MoS_2$ | as NiS | as CoS | RVSA | RWSA |
| Comparative A | 15 | — | 3 | 100 | 100 |
| 1 | 13 | 3 | — | 1400 | 1230 |
| B | 13 | — | 3 | 1030 | 905 |

These results show the unexpectedly high hydrodesulfurization activity obtained by preparing carbon supported hydrodesulfurization catalysts by the process of the present invention.

EXAMPLES 4–6

A. Impregnation to Provide $MoS_2$ Content

The procedure of Example 1A was followed in each example.

B. Impregnation to Provide Other Metal Content

The procedure of Example 1B was followed in every material detail except that the impregnating solution content was varied as to concentration or metal compound to provide the catalyst compositions as shown in Table III. Also shown in Table III are the thiophene activity values as obtained following the procedure of Example 3.

TABLE III

Thiophene Activity of Various Catalysts

| Ni Salt Form | Catalyst of Example | MoS$_2$ | Activator Content (%) as NiS | as CoS | RVSA | RWSA |
|---|---|---|---|---|---|---|
| — | Comparative A | 15 | — | 3 | 100 | 100 |
| formate | 4 | 13 | 0.9 | — | 502 | 504 |
| acetate | 5 | 13 | 0.9 | — | 502 | 503 |
| acetate | 6 | 13 | 5.0 | — | 1360 | 1150 |

These results also show the unexpectedly high hydrodesulfurization activity obtained by preparing carbon supported hydrodesulfurization catalysts by the process of the present invention.

EXAMPLE 7–11

A. Impregnation to Provide MoS$_2$ Content

The procedure of Example 1 was followed in every material detail except that the concentration of ammonium thiomolybdate used to impregnate the carbon support was increased to provide 14% MoS$_2$ on the support and the carbon support had the following properties:

| | |
|---|---|
| SA$_{BET}$, m$^2$/gm. | 1050 |
| PV, cc/gm. | 0.94 |
| CBD, g/cc. | 0.44 |
| r, A | 17 |
| Particle Size | 12 × 40 mesh |

B. Impregnation to Provide Nickel Formate Content

The procedure of Example 1B was followed except that nickelous formate was used in the impregnating solution in amounts to provide the contents of NiS when sulfided as shown in Table IV. Also shown in Table IV are the thiophene activity values as obtained following the procedure of Example 3.

TABLE IV

Thiophene Activity of Various Catalysts

| Catalyst of Example | MoS$_2$ | Activator Content (%) as NiS | as CoS | RVSA | RWSA |
|---|---|---|---|---|---|
| Comparative A | 15 | — | 3 | 100 | 100 |
| 8 | 14 | 0.47 | — | 400 | 390 |
| 9 | 14 | 0.85 | — | 502 | 500 |
| 10 | 14 | 2.56 | — | 910 | 865 |
| 11 | 14 | 3.68 | — | 1110 | 1045 |

EXAMPLE 12

Catalyst Evaluation-Gas Oil Test

The catalysts of Examples 1 and 5 and Comparative Example A were evaluated in the Gas Oil Test described above. The activity of the catalyst of Comparative Example A was arbitrarily assigned an activity value of 100 and the activity values of the other catalysts are expressed relative to this value. The activity values were determined on equal volumes of catalyst particles. Results are given in Table V.

TABLE V

| Catalyst of Example | Activity Values-Gas Oil Test RVSA (%) 650° F. | 725° F. |
|---|---|---|
| Comparative A | 100 | 100 |
| 1 | 377 | 1255 |
| 5 | 303 | 589 |

These results again demonstrate the superior activities obtained with catalysts prepared according to the present invention compared to that prepared by the prior art procedure.

EXAMPLE 13

In this example, a comparison was made of the hydrodesulfurization activity of the catalyst of Example 1 with that of a commercial hydrodesulfurization catalyst based on alumina. The commercial catalyst had a composition equivalent to 15% MoO$_3$ and 3% CoO on alumina.

The procedure followed in testing was that given in accordance with the Gas Oil Test described above except that the operating temperature was 725° F. only and the percent sulfur actually removed on a catalyst weight basis was determined. Results are given in Table VI.

TABLE VI

| Catalyst Identity | Gas Oil Activity At 725° F. Sulfur Removal (%) |
|---|---|
| Commercial Alumina Based | 97.2 |
| Example 1 | 97.0 |

These results show that a carbon supported catalyst prepared in accordance with the process of the present invention is essentially equivalent in sulfur removal involving gas oils to the conventional alumina based catalyst. The support structures of the catalysts compared are greatly different, the alumina support having pores of considerably larger diameter than those present in the carbon supports of the present examples. However, carbon supported catalysts of the present examples have excellent intrinsic activity, as demonstrated by the thiophene tests, and this excellent intrinsic activity tends to offset the disadvantages of small pore radius in gas oil tests. Use of carbon supports of larger pore radius in the process of the present invention would thus appear to be desirable where larger molecules are involved in hydrodesulfurization reactions.

EXAMPLE 14

The carbon used is as in Example 1. The support is first impregnated with an aqueous solution of ammonium heptamolybdate in sufficient quantity to deposit an amount of molybdenum equivalent to 13% MoS$_2$ upon subsequent sulfiding. The impregnated support is then dried in air and in vacuum as in Example 1. The dried support is then sulfided with H$_2$S until the MoS$_2$ content specified is obtained. The sulfided catalyst is then impregnated with cobalt nitrate [Co(NO$_3$)$_2$] solution to provide the equivalent of 3% CoS. This represents an alternative manner of obtaining the catalyst of Example 2.

EXAMPLE 15

The carbon used is again as in Example 1. The support is first impregnated with an aqueous solution of ammonium heptamolybdate in sufficient quantity to deposit an amount of molybdenum equivalent to 6.5% MoS$_2$ upon subsequent sulfiding. The support is then dried and sulfided as in Example 14. The sulfided catalyst is impregnated with cobalt nitrate as in Example 14. The cobalt treated support is then dried in the manner following the first treatment with ammonium heptamolybdate. After drying the cobalt treated support, it is again treated with sufficient ammonium heptamolybdate solution to deposit an additional amount of molybdenum equivalent to 6.5% MoS$_2$. This represents an alternative manner of obtaining the catalyst of Example 14.

EXAMPLE 16

The procedure of Example 15 is followed to provide a support containing the equivalent of 6.5% MoS$_2$ thereon. Then, deviating from the procedure of Example 15, the additional ammonium heptamolybdate and cobalt nitrate are applied from a single aqueous solution to provide the equivalent of 3% CoS and a total equivalent of 13% MoS$_2$. This represents an alternative manner of obtaining the catalyst of Example 14.

I claim:

1. A process for preparing an improved hydrodesulfurization catalyst for petroleum fractions which comprises:
   (1) depositing upon a carbon support sufficient of a molybdenum compound capable of being converted to MoS$_2$ to provide a support after said conversion containing from about 5 to about 25 weight percent MoS$_2$, based on the weight of said support;
   (2) treating the support obtained from step (1) to convert said molybdenum compound to MoS$_2$;
   (3) depositing upon the support obtained from step (2) in at least one step sufficient of a molybdenum compound capable of being converted to MoS$_2$ to increase the content of MoS$_2$ on said support after said conversion to a total of about 10 to about 25 weight percent, based on the weight of said support, and sufficient of a metal compound selected from the group consisting of nickel and cobalt compounds capable of being converted to corresponding metal sulfide to provide from about 0.4 to 8.0 weight percent of said metal compound, based on the weight of said support.

2. The process of claim 1 wherein the amount of MoS$_2$ in said catalyst is about 12–16 weight percent.

3. The process of claim 1 wherein the amount of metal compound in said catalyst is about 0.9 to 5.0 weight percent.

4. The process of claim 1 wherein said metal compound is nickelous formate.

5. The process of claim 1 wherein said metal compound is nickelous acetate.

6. The process of claim 1 wherein said metal compound is cobaltous acetate.

7. The process of claim 1 wherein step (1) is carried out using a solution of MoO$_3$ is aqueous (NH$_4$)$_2$S.

8. The process of claim 7 wherein step (2) is carried out by heating said support at a temperature in the range of 300°–450° C in an inert atmosphere.

9. The process of claim 8 wherein step (2) is carried out at a temperature in the range of 400°–450° F.

10. A process for the hydrodesulfurization of a petroleum fraction which comprises contacting said petroleum fraction with hydrogen at hydrodesulfurization and conditions in the presence of a catalyst prepared by the process of claim 1.

* * * * *

UNITED STATES PATENT OFFICE
CERTIFICATE OF CORRECTION

Patent No. 4,082,652          Dated 4th April, 1978

Inventor(s) JOHN DAVIDSON VOORHIES

It is certified that error appears in the above-identified patent and that said Letters Patent are hereby corrected as shown below:

Col. 12, Line 25, after $MoO_3$, delete "is" and insert -- in --

Col. 12, Line 34, delete "and" before conditions.

Signed and Sealed this

Twenty-second Day of August 1978

[SEAL]

Attest:

RUTH C. MASON
*Attesting Officer*

DONALD W. BANNER
*Commissioner of Patents and Trademarks*